US009712860B1

(12) United States Patent
Waggoner et al.

(10) Patent No.: US 9,712,860 B1
(45) Date of Patent: Jul. 18, 2017

(54) DELIVERING MEDIA CONTENT TO ACHIEVE A CONSISTENT USER EXPERIENCE

(71) Applicant: Amazon Technologies, Inc., Seattle, WA (US)

(72) Inventors: Charles Benjamin Franklin Waggoner, Portland, OR (US); Joshua B. Barnard, Seattle, WA (US); Matthew James Bordenet, Sammamish, WA (US); James Eric Knowler, London (GB); Marc Joliveau, Seattle, WA (US); Patrik Schnell, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 14/569,315

(22) Filed: Dec. 12, 2014

(51) Int. Cl.
*H04N 21/2662* (2011.01)
*H04N 21/2385* (2011.01)
*H04N 21/234* (2011.01)
*H04N 21/2343* (2011.01)
*H04N 21/845* (2011.01)
*H04L 29/06* (2006.01)

(52) U.S. Cl.
CPC ....... *H04N 21/2662* (2013.01); *H04L 65/607* (2013.01); *H04N 21/2385* (2013.01); *H04N 21/23418* (2013.01); *H04N 21/23439* (2013.01); *H04N 21/8456* (2013.01)

(58) Field of Classification Search
USPC .......................................... 725/95
See application file for complete search history.

(56) References Cited

U.S. PATENT DOCUMENTS

| 2013/0016224 | A1* | 1/2013 | Davis | H04N 17/004 348/192 |
| 2013/0297743 | A1* | 11/2013 | Eschet | H04L 65/60 709/219 |
| 2015/0023404 | A1* | 1/2015 | Li | H04N 19/00345 375/240.02 |

OTHER PUBLICATIONS

"Recommendation ITU-R BT.500-13: Methodology for the Subjective Assessment of the Quality of Television Pictures," International Telecommunication Union ,(Jan. 2012), 46 pages.

\* cited by examiner

*Primary Examiner* — Mulugeta Mengesha
(74) *Attorney, Agent, or Firm* — Weaver Austin Villeneuve & Sampson LLP

(57) ABSTRACT

Techniques for delivering content are described that vary the bit rate with which the content is delivered to achieve a consistent level of quality from the user's perspective. This is achieved through the use of quality metrics associated with content fragments that guide decision making in selecting from among the different size fragments that are available for a given segment of the content. Fragment selection attempts to optimize quality within one or more constraints.

21 Claims, 5 Drawing Sheets

DELIVERING MEDIA CONTENT TO ACHIEVE A CONSISTENT USER EXPERIENCE

BACKGROUND

Conventional adaptive streaming techniques for video and audio content often use bit rate as a proxy for quality and focus on streaming the highest constant bit rate below the bandwidth available to the client device. However, bit rate is only a coarse approximation for content quality. As a result, the selected bit rate is often unnecessarily high for frames and fragments that encode relatively small amounts of information, and insufficient for frames and fragments that encode large amounts of information. Not only is this an inefficient allocation of bandwidth, the resulting variability in the quality of the delivered content often becomes perceptible and negatively impacts the user experience.

DETAILED DESCRIPTION

This disclosure describes techniques for delivering content that vary the bit rate with which the content is delivered to achieve a consistent level of quality from the user's perspective. This is achieved through the use of quality metrics associated with content fragments that guide decision making in selecting from among the different fragments that are available for a given segment of the content (e.g., as specified in the manifest file associated with the content). Rather than attempting to maintain bit rate, the techniques enabled by this disclosure focus on maintaining a consistent level of quality within available bandwidth. More generally, fragment selection is done based on the quality metrics to attempt to optimize quality within one or more constraints (e.g., bandwidth, file size, download time, available buffer, etc.). As will be described, implementations are contemplated in the contexts of both streaming and downloading of content.

Figure 1:
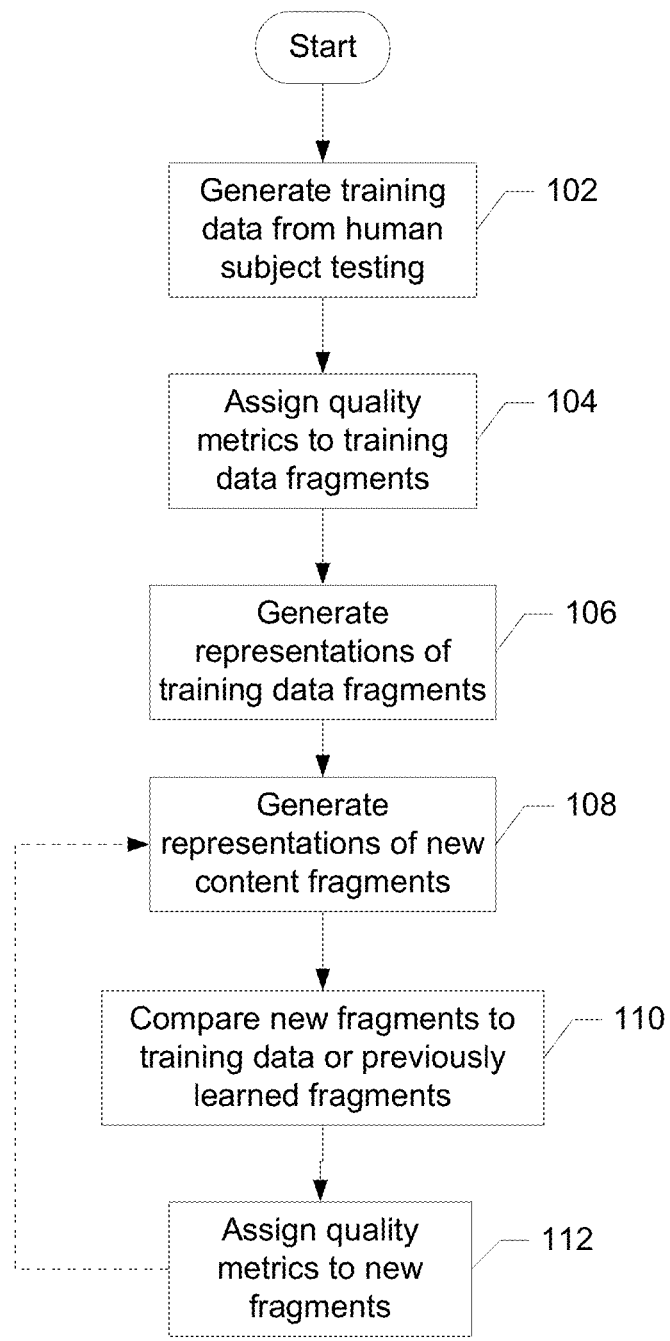
FIG. 1 is a flow diagram illustrating operation of a particular class of implementations.

According to a particular class of implementations, the quality metrics are derived and assigned to content fragments (or sequences of content fragments) using machine learning techniques that are seeded with training data generated through the use of human subject testing (e.g., double blind testing). According to a particular implementation illustrated in FIG. 1, the subjects are asked to provide relative ratings of two or more versions of the same segment of content, e.g., whether there is a perceivable difference, which one looks or sounds better, etc. A variety of conditions and/or characteristics of the different versions (e.g., device type, display type, fragment or frame size, amount of information encoded, etc.) are varied over a range of segments and content to determine under what conditions a quality difference is perceivable, the percentage of viewers perceiving the difference, the degree of the preference, etc., so as to create a robust and representative training data set for subsequent machine learning (102).

Suitable test methodologies for acquiring this training data may have similarities with those used in testing and validation of new video or audio codecs as compared to earlier versions. However, rather than comparing content encoded with different codecs, the techniques enabled by the present disclosure generate a baseline for comparison of versions of the same content that are encoded differently using the same codec. According to some implementations, the quality metrics may be determined from human subject rating data acquired using methodologies similar to those described in *Methodology for the subjective assessment of the quality of television pictures*, Recommendation ITU-R BT.500-13 (January 2012), the entire disclosure of which is incorporated herein by reference for all purposes. As will be appreciated however, this is merely one example of a suitable methodology.

According to some implementations, each of the content fragments of the training data set is assigned a quality metric based on the human subject ratings (104). That is, the ratings are converted into values which may be, for example, ordinal values on a substantially linear scale (e.g., according to a particular implementation, the quality metrics are 8-bit integers from 0 to 255). The result is a quality metric for each fragment of content in the training data set that represents how the human subjects rated the quality of that content, and therefore how subsequent viewers are likely to rate the quality of that content. It should be noted that, although the quality metrics may be associated with each fragment (i.e., a unit of content with respect to which media players typically make decisions), implementations are contemplated in which quality metrics are instead associated with some other unit of content, e.g., individual frames, groups of frames within a fragment, groups or sequences of fragments, a duration of time within the content, a segment of the content, etc. Therefore, although implementations are described below in which quality metrics are associated with individual fragments, the scope of this disclosure is not so limited.

A representation of each fragment in the training data set is generated to support machine learning (106). The representation of a fragment is generated with reference to a subset of parameters associated with that fragment and/or its constituent frames. For video fragments, such frame parameters might include, for example, quantization parameters, rate factors, frame size, frame type, what portion of a frame is intra versus predicted, the degree of motion in a frame, whether a frame is black, whether a frame is part of a fade, peak signal-to-noise ratio (PSNR), a codec's internal metric(s) (e.g., Rate Factor in x264 and x265), relative and absolute number of bits spent on intra prediction, motion vectors, residual coding, chroma information, luma information, spatial and temporal frequency distribution, what other frames such frames reference, what frames they are referenced by, position in the fragment, position in a scene, if a frame starts or ends a fragment, Structural Similarity (SSIM), MOtion-based Video Integrity Evaluation (MOVIE) index, Tektronix PQA, etc. For audio fragments, such parameters might include, for example, quantization parameters, PSNR, Perceptual Evaluation of Audio Quality (PEAQ), etc. The parameters for a given content fragment or group of fragments may not necessarily be derived from its constituent frames but may be any information by which the fragment or group of fragments can be reliably compared and classified in a manner that is predictive of perceived quality.

A suitable representation of a fragment or group of fragments might be, for example, a vector that includes numeric representations derived from such parameters as operands. The operands may be weighted for different kinds of emphasis. Such a vector might be used, for example, as a test vector for a Support Vector Machine (SVM) machine learning process. Other possible representations would depend on the kind of machine learning techniques employed (e.g., regression analysis, neural networks, deep learning techniques, etc.).

These baseline data are then used in accordance with the selected machine learning technique to assign quality metrics to content fragments (or groups of fragments) not included in the training set. As will be appreciated, this would involve generating representations of each of these content fragments (or groups of fragments) using the same fragment and/or frame parameters (108), comparing these representations to those of the learning data set (or previously learned fragments) (110), and assigning quality metrics to the fragments (or groups of fragments) based on the comparison (112). For example, a vector representation of an unclassified fragment could be compared to the vectors of the training data and, where a sufficiently close match is found, a similar quality rating could be assigned. As will also be appreciated, this process may be iterative, with the correlations between fragment characteristics and quality metrics evolving to reflect a more sophisticated state of learning such that the quality metrics become more reliably predictive of the perceived quality of the corresponding content fragments.

According to a particular class of implementations, the quality metrics for a given piece of content (e.g., a video title or an audio track) are included in the manifest file for that title that is typically acquired by the media player on the client in connection with the downloading or streaming of the content. As will be understood by those of skill in the art, the manifest file identifies the different fragment options for each segment of the content that may be requested by the media player or otherwise selected for delivery to the client. As mentioned above, the quality metrics may be associated with the content in a variety of ways (e.g., with individual fragments, groups of fragments, etc.). More generally, there are a wide variety of ways in which quality metrics may be provided with content to support the kinds of decision making described herein. That is, the quality metrics may be provided as metadata embedded in or otherwise associated with the fragments or groups of fragments themselves. Examples of how such quality metrics may be employed are described below.

Figure 2:
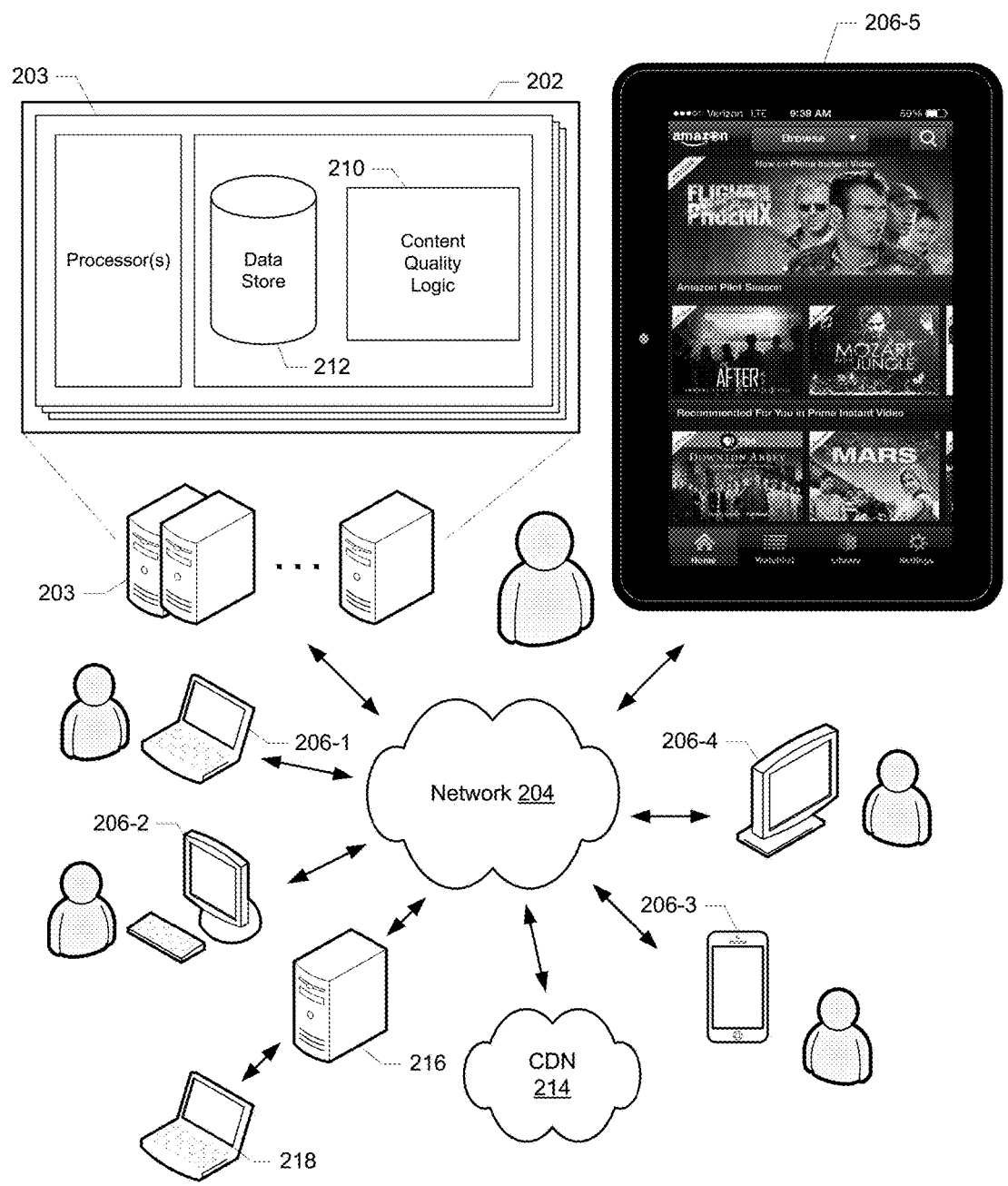
FIG. 2 illustrates an example of a network environment in which content may be delivered as described herein.

FIG. 2 illustrates an example of a computing environment in which a video content service 202 provides content via network 204 to a variety of client devices (206-1 through 206-5) associated with users in accordance with the techniques described herein. Content service 202 (which may provide video and/or audio content) may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

In the following examples and for the sake of simplicity, content service 202 is described as if it were integrated with the platform(s) that provides the content to client devices. Alternatively, content service 202 may provide access to content in conjunction with one or more content delivery networks (e.g., CDN 214) that may or may not be independent of content service 202. Other variations known to those of skill in the art are contemplated to be within the scope of the invention.

Some of the implementations enabled by the present disclosure contemplate logic resident on the client devices consuming content from content service 202; such logic being configured to make decisions using the quality metrics associated with the content. The logic might be implemented, for example, in a media player on the client device or as a separate application resident on the client device. However, it should be noted that implementations are also contemplated in which content service 202 includes logic that facilitates at least some aspects of the delivery of content as described herein (e.g., content quality logic 210). Content service 202 may also include user account information (e.g., in data store 212) as well as business logic (not shown) that governs the operation of the service and management of user accounts. According to some implementations, data store 212 may also include the content (including associated manifest files and/or fragment metadata) to which service 202 provides access. Alternatively, content may be provided and/or hosted by one or more separate platforms, e.g., CDN 214. It should be noted that, while content quality logic 210 and data store 212 are contemplated as integrated with content service 202, implementations are contemplated in which either or both operate remotely from the associated content service, and/or either or both are under the control of an independent entity.

The computing environment of FIG. 2 may also include a platform (e.g., represented by server 216 and laptop 218)

by which quality metrics may be generated and assigned to the fragments of content using machine learning techniques as described above with reference to FIG. 1. Such a platform may be integrated with or under control of the entity associated with content service 202. Alternatively, such a platform may be provided as a third-party service that, for example, modifies the manifest files provided by content providers to include quality metrics (or otherwise provide fragment metadata) to support content fragment selection as described herein.

Figure 3:
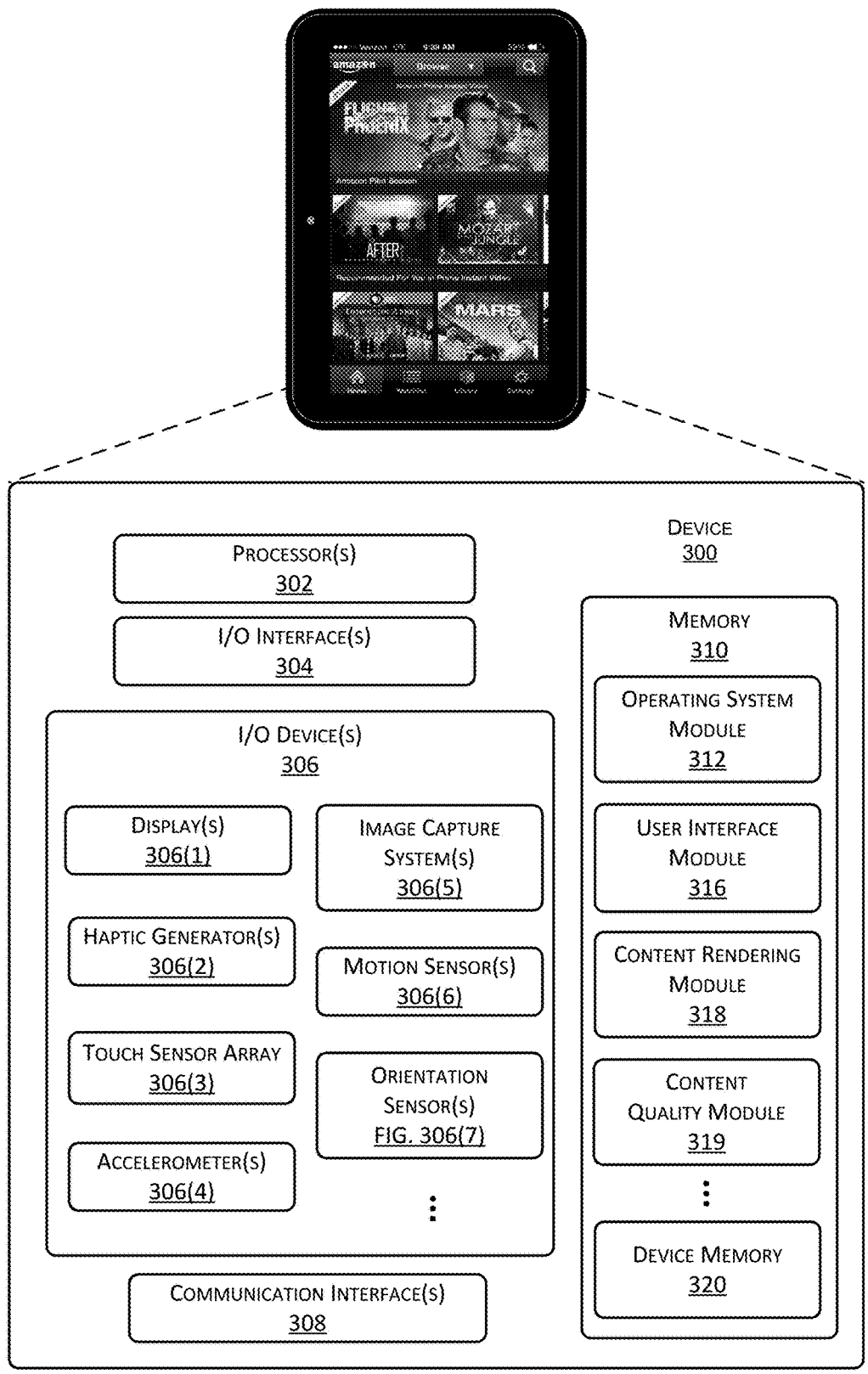
FIG. 3 is a simplified block diagram of an electronic device that may be employed with various implementations.

A block diagram of an example of a client device 300 suitable for use with various implementations is shown in FIG. 3. Device 300 includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be a capacitive sensor array having a matrix of conductors that are scanned to determine, for example, the location, duration, speed and direction of touch events within the matrix based on changes in electrical capacitance.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules.

Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic or computer program instructions used to support content fragment selection as described herein (represented by content quality module 319) may be implemented in a variety of ways. For example, at least some of this functionality may be implemented as part of the code of a media player operating on device 300. Alternatively, content quality module 319 may be implemented separately from the device's media player. And as mentioned above, implementations are contemplated in which at least a portion of the logic or computer program instructions may reside on a separate platform, e.g., service 202, CDN 214, etc. Suitable variations and alternatives will be apparent to those of skill in the art. It will also be understood that device 300 of FIG. 3 is merely an example of a device with which various implementations of the present invention may be practiced, and that a wide variety of other devices types may also be used (e.g., devices 206-1 to 206-5). The scope of the invention should therefore not be limited by reference to device-specific details.

Figure 4:
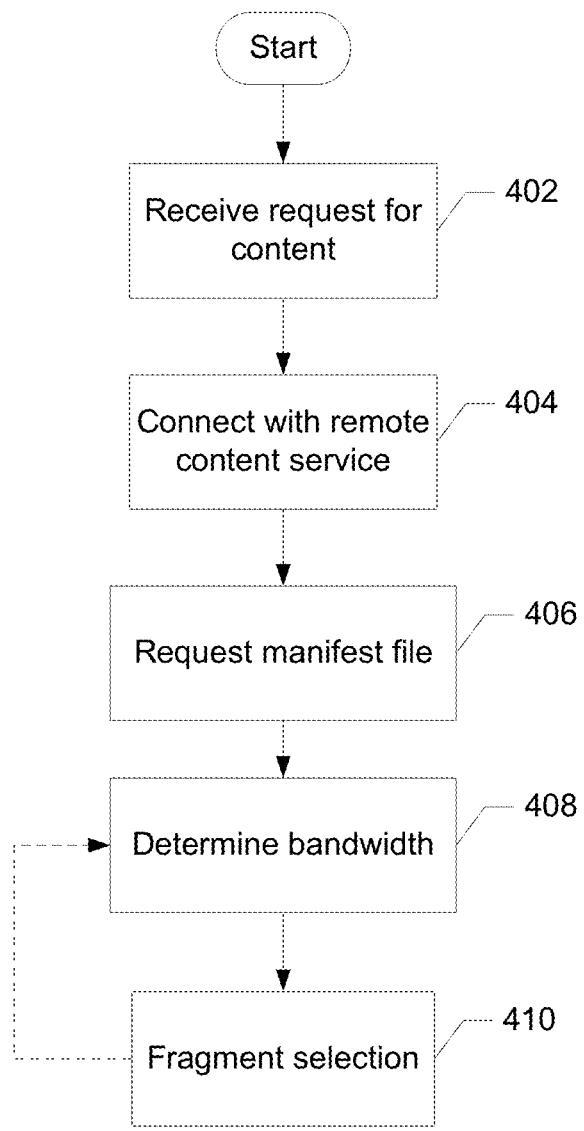
FIG. 4 is a flow diagram illustrating operation of another class of implementations.

The streaming of video content to a client device according to a particular implementation is illustrated in the flow chart of FIG. 4. This and other examples described herein assume the use of H.264 encoding. However, it will be understood that the basic principles described herein may be employed with any of a variety of codecs including, for example, MPEG-1, MPEG-2, MPEG-4 Part 2, VC-1, H.263, VP8, VP9, Daala, and H.265 (also commonly referred to as HEVC). This example also assumes a media player on the client device that includes logic (e.g., module 319) configured to use the quality metrics as described herein.

When a user selects a video title (e.g., in the user interface of the media player), a request for that content is received by the media player (402). The media player connects with a remote video content service (404), e.g., content service 202 of FIG. 2, and requests the manifest file for the selected title (406).

As will be understood, the manifest file includes information relating to the requested content that allows the media player to generate properly formatted requests for specific fragments of the content. For a particular segment of the content, the manifest file will typically identify a number of different options (e.g., 8-15) for fragments that may be requested for playback of that segment. The fragments for a given content segment may be of different sizes, for different streaming protocols, for different display resolutions, etc. According to some implementations, each fragment in the manifest file has an associated quality metric derived as described herein that is predictive of how a viewer would rate the visual quality of the fragment. The media player then proceeds to select the best quality fragment for each segment of the content for playback in real time to maintain a consistent user experience within available bandwidth.

That is, the media player determines the bandwidth available to the client device (408) and selects a fragment for each segment of the content using the quality metrics to ensure a consistent level of quality during playback within that bandwidth (410). Again, it should be noted that the quality metrics used to guide fragment selection may be associated with other units of content (e.g., groups or sequences of fragments) and may be delivered using mechanisms other than the manifest file (e.g., as metadata associated with the fragments or groups of fragments).

And as will be appreciated, the available bandwidth may change while the content is streaming, so the media player may monitor the available bandwidth while the content is streaming and adjust its decision making to ensure consistent quality within the new bandwidth constraint. The media player may also be configured to predict or estimate available bandwidth out into the future (e.g., the duration of its streaming buffer) so that it can select the sequence of fragments at least that far in advance. Some examples of the decision making behind selection of content fragments will be illustrative.

In one example, a segment of video content might be dominated by a fade between scenes or a sequence of frames in which the encoded visual information does not change much. Using this information, the media player might choose a smaller version of the fragment because the difference in quality between the different size fragments is not likely to be noticeable. By contrast, for a segment of video content dominated by movement, a larger fragment might be chosen as the difference in quality as compared to smaller fragments would be significant.

When starting playback, sometimes no content has been buffered and information about available bandwidth is unreliable. A heuristic might have associated logic that initiates video playback as soon as the first 10 seconds of video have been buffered, but that also requires that playback start within 2 seconds of the customer hitting play. The heuristic could determine the optimal sequence of fragments that provide the best quality that would download the first 10 seconds of video within two seconds. In cases where the first fragment is simply black video at a very low bitrate, the quality of later fragments can thus be higher. This can result in higher initial video quality than with typical heuristics that just start with a default bitrate and adjust from there.

As will be appreciated, a video title typically has an associated audio soundtrack for which fragment options are also identified in the title's manifest file for each segment of the audio content (which may not necessarily line up in time with the segments of the video content). As mentioned above, implementations are contemplated in which quality metrics are derived and associated with each of the audio fragments (or each group of audio fragments) in a manner similar to the way in which they are associated with video fragments. Thus, the media player may also be configured to ensure a consistent level of quality for the audio soundtrack of a video title as described with reference to FIG. 4. These processes may take place in parallel, with a portion of the total available bandwidth being designated for streaming of the video content and another portion being designated for streaming of the audio content. That is, the media player may separately select video and audio fragments to ensure a consistent level of quality for each within the bandwidth available for each.

Alternatively, implementations are contemplated in which the selection of video fragments and audio fragments is interdependent. For example, in a video streaming context characterized by low bit rates, it may be desirable to make tradeoffs between video and audio quality. That is, users tend to react poorly to low quality audio more than to low quality video. It may therefore make sense in such contexts to ensure a minimum audio quality before designating any remaining available bandwidth for the streaming of the video content. For example, if the available bandwidth to stream a video is varying considerably (e.g., between 50 and 200 kilobits per second), the media player may designate 16 kilobits per second of that bandwidth as the minimum allowable for the audio soundtrack, thus driving selection of audio fragments in a manner which meets that constraint, while forcing the selection of video fragments to adjust to the remaining available bandwidth. In another example, if the device has 200 kilobits per second of available bandwidth, the media player might choose 16 kilobit per second as the bandwidth constraint for the audio fragments (e.g., instead of 48 kilobit per second audio) to be able to designate an extra 32 kilobits per second to the bandwidth constraint for the video fragments. Other variations of possible tradeoffs that might be effected will be apparent to those of skill in the art.

While implementations enabled by the present disclosure will typically use available bandwidth more efficiently than conventional techniques, there may be instances in which some of the available bandwidth is not consumed by the streaming of content fragments after a specified level of quality is met. According to some implementations, the content quality logic is configured to determine when the selection of fragments will result in such available bandwidth and to make decisions about how that available bandwidth might be used. For example, the media player may make use of that bandwidth by initiating downloading of future content (e.g., the first fragment(s) of the next chapter) or extra content (e.g., special features). Alternatively, the available bandwidth could be used to raise the quality level of the content being streamed, e.g., fragment selection could be done with reference to a higher bandwidth constraint.

Figure 5:
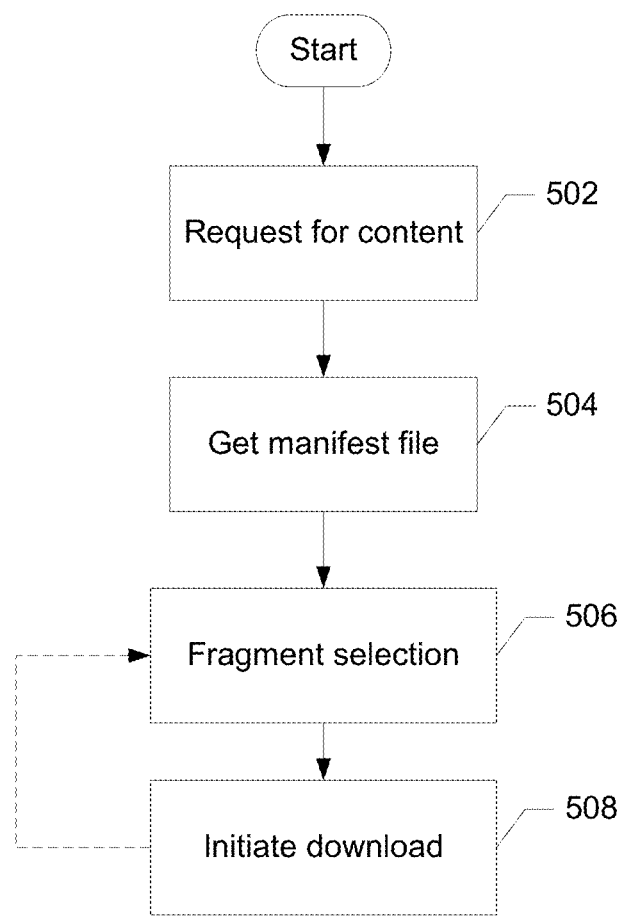
FIG. 5 is a flow diagram illustrating operation of another class of implementations.

The downloading of video content to a client device according to a particular implementation is illustrated in the flow chart of FIG. 5. This example assumes logic associated with a content service (e.g., content quality logic 210 of content service 202 of FIG. 2) that is configured to use the quality metrics as described herein. However, it should be noted that similar decisions could also be made by code resident on the requesting client.

When a user selects a video title (e.g., in the user interface of a client device), the request for that content is received or detected by the content quality logic (502) which requests or retrieves the manifest file (and/or fragment metadata) for the selected title (504). Based on one or more constraints, the content quality logic selects a sequence of fragments for the segments of the requested video title (506). The constraint(s) may relate, for example, to a file size or a download time, and may be specified by the user, code on the client device (e.g., the media player), or the content quality logic. The content quality logic then selects the fragments using the quality metrics to meet the constraint(s) while providing a consistent user experience in terms of quality. More generally, whatever the constraint (file size, download time, etc.) fragment selection is done based on the quality metrics to attempt to optimize quality within that constraint.

Downloading of the selected video title to the client device is based on the selected fragments (508). As will be appreciated, downloading can begin before all fragments have been selected (as indicated by the dashed arrow between 508 and 506) with the selection possibly adapting to changing network conditions. Alternatively, instead of only looking ahead for a short period of time, the content quality logic can look ahead (as much as the entire duration of the content) to determine which of the available fragments to select. According to some implementations, a latency constraint may be placed on the amount of time that can pass between selection of the content and initiating the download. In such a case, fragment selection may also be guided (at least initially) with reference to this constraint.

Some examples of the decision making behind selection of content fragments will be illustrative.

In one example in which the file size is specified (e.g., with reference to available memory space, device type, etc), two fragments for the same segment of content are very different in size but the delta for the quality metric is not very large. In such a case, the much smaller fragment will likely be selected because of the low impact on quality. On the other hand, if the quality delta is very high, the larger fragment is more likely to be selected.

A common use case for downloading is to download multiple titles to a device in advance of an anticipated period of time with little or no connectivity such as, for example a long airplane flight. Conventional devices require the user to know how much space is available, and manage downloads to fit in the available space. However, by using quality metrics as enabled by the present disclosuer, a heuristic could determine the optimal quality sequence of fragments for any arbitrary amount of storage. For example, a device may always reserve 1 GB of free space, so the maximum download size would be free storage less 1 GB. This technique could be extended across multiple titles being downloaded at once. Thus, for a given amount of storage, the optimal sequence of fragments for all titles will be chosen to provide optimal quality across all titles. Thus an easy to encode cartoon might download with a much lower average bitrate than an action movie, with both titles having similar overall quality.

According to some implementations, fragment selection (whether done at the client or some remote platform) can take into account contextual information relating to the client device, i.e., characteristics and/or capabilities of the client device. For example, the value of Ultra-High Definition (UHD) video in terms of perceived visual quality is not as high for a 5-inch screen as for a 65-inch screen. Therefore, content quality logic may take the display size of the target device into account; effectively placing more weight on the value of a UHD fragment in one context versus another. According to some implementations, characteristics and/or capabilities of the client device can be used by the content quality logic to apply weights or corrective factors to the quality metrics associated with different fragment options. In another example, the decode cost in battery life could be estimated (e.g., as proportional to frame area with some contribution from bitrate). This would allow the decision making of the content quality logic to include battery life as a constraint in making fragment selections, e.g., selection of fragments that allow the device to remain within some battery usage constraint (e.g., completion of a movie with at least 10% battery left).

According to some implementations, fragment selection can take into account a user's bandwidth cap or metered cost. For example, a media player running on a tablet connected to LTE could be aware of the customer's remaining bandwidth cap for the month and which day that resets. If the customer is consuming bandwidth at a pace that would cause them to exceed their monthly cap, maximum bandwidth consumed for a given title can be reduced to keep the customer on track to not exceed their cap. Conversely, if a user has lots of bandwidth left near the end of their metering period, higher bitrates could be used.

Not only can the characteristics and/or capabilities of the client device be considered, implementations are contemplated in which fragment selection may be done for clients that are not configured to support the kind of decision-making enabled by the present disclosure. That is, as mentioned above, the decision-making logic that guides fragment selection could be implemented entirely at the back end on the original content server (or in any of the intervening devices) to assemble the best sequence of fragments. The back end might also use the available information for other things such as, for example, generating an optimal constant-bit-rate stream for a given title. More generally, the back end can refer to any of a variety of technical and/or business constraints within which it achieves the highest average user experience.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A device, comprising:

memory;

a network interface configured to receive an encoded video stream representing video content;

a display; and one or more processors configured to:

receive a request for the video content, the video content including at least one video segment and having an associated audio soundtrack including at least one audio segment;

request a manifest file corresponding to the video content, the manifest file identifying a set of video fragments for each of the video segments of the video content, each set of the video fragments including different versions of the corresponding video segment of the video content, each of the video fragments including a plurality of frames, each of the frames being characterized by a plurality of frame parameters, the manifest file including a video quality metric for each of the video fragments, each of the video quality metrics being derived with reference to a subset of the frame parameters of the frames of the corresponding video fragment, each of the video quality metrics being assigned to the corresponding video fragment based on human subject rating data such that it is predictive of visual quality of the corresponding video fragment as subjectively perceived by a user, the manifest file also identifying a set of audio fragments for each audio segment of the audio soundtrack, each set of the audio fragments including different versions of the corresponding audio segment of the audio soundtrack, wherein each of the audio fragments is characterized by a plurality of audio fragment parameters, the manifest file including an audio quality metric for each of the audio fragments, each of the audio quality metrics being derived based on the parameters of the corresponding audio fragment, each of the audio quality metrics being predictive of audio quality of the corresponding audio fragment perceived by a user;

weight the video quality metrics for at least some of the sets of video fragments based on one or more characteristics of a target playback device, thereby generating weighted video quality metrics;

request a video fragment from each set of video fragments for each of the video segments of the video content based on the weighted video quality metrics and available bandwidth to ensure a substantially consistent visual quality during playback of the video content, the encoded video stream including the requested video fragments;

request one audio fragment from each set of audio fragments for each of the audio segments of the audio soundtrack based on the audio quality metrics, the available bandwidth, and the requested video fragments, the requests for the audio fragments and the video fragments being interdependent to ensure a minimum audio quality during playback of the video content; and decode the encoded video stream for playback on the display.

2. The device of claim 1, wherein the one or more processors are further configured to determine the available bandwidth with reference to the encoded video stream and to adjust requesting of the requested video fragments accordingly.

3. A computer-implemented method, comprising:

receiving a request for content, the content including a plurality of segments;

receiving fragment metadata corresponding to the content, the fragment metadata identifying one or more sets of fragments for each of the segments of the content, the one or more sets of fragments corresponding to one or more versions of the corresponding segment, each set of fragments being characterized by one or more parameters, the fragment metadata including a quality metric for each set of fragments, each of the quality metrics being derived with reference to the one or more parameters of the corresponding set of fragments, each of the quality metrics being assigned to the corresponding set of fragments based on human subject rating data such that it is predictive of playback quality of the corresponding set of fragments as subjectively perceived by a user;

weighting the quality metrics for at least some of the sets of fragments based on one or more characteristics of a target playback device, thereby generating weighted quality metrics; and selecting a set of fragments for each of the segments of the content based on the weighted quality metrics and available bandwidth to provide a substantially consistent quality during playback of the content, wherein the segments of the content include both video segments and audio segments, and wherein selecting the sets of fragments for the video segments is interdependent with selecting the sets of fragments for the audio segments to ensure a minimum audio quality during playback of the content.

4. The method of claim 3, wherein each set of fragments is a single fragment or a sequence of fragments.

5. The method of claim 3, wherein the fragment metadata are included in a manifest file corresponding to the content.

6. The method of claim 3, further comprising one of:

receiving an encoded stream including the selected fragments;

downloading a file including the selected fragments;

transmitting an encoded stream including the selected fragments; or transmitting a file including the selected fragments.

7. The method of claim 3, wherein selecting the sets of fragments is also done with reference to one of a target file size, available memory space, a target download time, a specified quality, a client device characteristic, a client device capability, a buffer duration, or a latency constraint.

8. The method of claim 3, further comprising:

receiving an encoded stream including the selected fragments;

identifying a period of time during which the encoded stream does not consume the available bandwidth; and requesting additional content for delivery during the period of time.

9. The method of claim 3, wherein the content comprises a plurality of different video titles, and wherein selecting the sets of fragments is also done with reference to available memory space on the target playback device requesting the content.

10. The method of claim 3, wherein selecting the sets of fragments includes determining one or more network conditions, and adapting selection of the sets of fragments with reference to changes in the network conditions.

11. The method of claim 10, further comprising predicting the one or more network conditions for a future period of time, wherein selecting the sets of fragments includes selecting first ones of the sets of fragments for delivery during the future period of time with reference to the predicted network conditions.

12. The method of claim 3, wherein selecting the sets of fragments includes selecting an initial sequence of the sets of fragments to satisfy a latency constraint for initiating delivery of the content.

13. A device, comprising:

memory;

a network interface;

a display; and one or more processors configured to:

receive a request for content, the content including a plurality of segments;

receive fragment metadata corresponding to the content, the fragment metadata identifying one or more sets of fragments for each of the segments of the content, the one or more sets of fragments corresponding to one or more versions of the corresponding segment, each set of fragments being characterized by one or more parameters, the fragment metadata including a quality metric for each set of fragments, each of the quality metrics being derived with reference to the one or more parameters of the corresponding set of fragments, each of the quality metrics being assigned to the corresponding set of fragments based on human subject rating data such that it is predictive of playback quality of the corresponding set of fragments as subjectively perceived by a user;

weight the quality metrics for at least some of the sets of fragments based on one or more characteristics of a target playback device, thereby generating weighted quality metrics;

request a set of fragments for each of the segments of the content based on the weighted quality metrics and available bandwidth to provide a substantially consistent quality during playback of the content, wherein the segments of the content include both video segments and audio segments, and wherein the one or more processors are configured to request the sets of fragments for the video segments and the sets of fragments for the audio segments in an interdependent way to ensure a minimum audio quality during playback of the content; and receive, via the network interface, an encoded stream including the requested fragments, or download, via the network interface, a file including the requested fragments; and render the content for presentation on the display.

14. The device of claim 13, wherein each set of fragments is a single fragment or a sequence of fragments.

15. The device of claim 13, wherein the fragment metadata are included in a manifest file corresponding to the content.

16. The device of claim 13, wherein the one or more processors are configured to request the sets of fragments with reference to one of a target file size, available memory space, a target download time, a specified quality, a client device characteristic, a client device capability, a buffer duration, or a latency constraint.

17. The device of claim 13, wherein the one or more processors are further configured to:

identify a period of time during which the encoded stream does not consume the available bandwidth; and request additional content for delivery during the period of time.

18. The device of claim 13, wherein the content comprises a plurality of different video titles, and wherein the one or more processors are configured to request the sets of fragments with reference to available memory space in the memory of the target playback device.

19. The device of claim 13, wherein the one or more processors are configured to request the sets of fragments by determining one or more network conditions, and adapting requesting of the sets of fragments with reference to changes in the network conditions.

20. The device of claim 19, wherein the one or more processors are further configured to predict the one or more network conditions for a future period of time, and wherein the one or more processors are configured to request the sets of fragments by requesting first ones of the sets of fragments for delivery during the future period of time with reference to the predicted network conditions.

21. The device of claim 13, wherein the one or more processors are configured to request the sets of fragments by requesting an initial sequence of the sets of fragments to satisfy a latency constraint for initiating delivery of the content.

* * * * *